United States Patent [19]

Kahle et al.

[11] 4,376,643
[45] Mar. 15, 1983

[54] APPARATUS FOR CONVEYING GLASS SHEETS

[75] Inventors: Lisa M. Kahle, Altoona; Stephen J. Schultz, Pittsburgh, both of Pa.

[73] Assignee: PPG Industries, Inc., Pittsburgh, Pa.

[21] Appl. No.: 306,027

[22] Filed: Sep. 28, 1981

[51] Int. Cl.³ .............................................. C03B 27/04
[52] U.S. Cl. ....................................... 65/351; 65/273; 65/348; 29/116 R; 29/125
[58] Field of Search ............... 29/116 R, 125; 65/273, 65/348, 351

[56] References Cited

U.S. PATENT DOCUMENTS

| | | | |
|---|---|---|---|
| 1,156,386 | 10/1915 | Armstrong . | |
| 1,516,083 | 11/1924 | Curtis . | |
| 1,927,849 | 10/1933 | Roberts | 26/63 |
| 2,828,852 | 4/1958 | Lorig | 198/127 |
| 2,948,384 | 8/1960 | Pate | 198/192 |
| 3,213,513 | 10/1965 | Robertson | 26/63 |
| 3,308,519 | 3/1967 | Westgate | 26/63 |
| 3,485,618 | 12/1969 | Ritter | 65/273 |
| 3,550,758 | 12/1970 | Stalker | 198/192 |
| 3,763,992 | 10/1973 | Klenk | 198/127 R |
| 3,799,752 | 3/1974 | Cheron | 65/351 |
| 3,871,855 | 3/1975 | Frank | 65/245 |
| 3,918,774 | 11/1975 | Nicholson | 308/187 |
| 3,961,737 | 6/1976 | Fatula | 226/192 |
| 4,033,497 | 7/1977 | Przygocki | 226/194 |
| 4,203,754 | 5/1980 | Potier | 65/273 |
| 4,226,608 | 10/1980 | McKelvey | 65/106 |
| 4,266,660 | 5/1981 | Herman | 29/116 R X |
| 4,311,509 | 1/1982 | Reader et al. | 65/351 |

*Primary Examiner*—Arthur D. Kellogg
*Attorney, Agent, or Firm*—Edward I. Mates

[57] ABSTRACT

A conveyor roll for conveying glass sheets and a conveyor comprising a plurality of said conveyor rolls is described. Each conveyor roll comprises a curved shaft conforming to the shape of said glass sheets transverse to their path of movement. A plurality of segments of essentially cylindrical configuration is mounted around said curved shaft. The segments have loosely interfitting tongues and grooves and a cylindrically shaped surface of a material that does not mar glass. When torque is applied to one of the end segments of said conveyor rolls, the glass engaging surfaces rotate in unison to convey the curved glass sheets through a treatment station included in glass sheet treating apparatus. A spring mounted about the shaft in position to apply axial pressure against the outer axial surface of the end segment to insure positive tongue in groove engagement would tend to mar said outer axial surface and to cause the end segment to drag in the absence of the present invention. The drag on different segmented rolls is uncontrolled and may easily lead to roll marking of the major surface of the glass sheets transported by the rotating segmented rolls, particularly when different end segments are dragged to different degrees.

The present invention interposes a thrust bearing, preferably one comprising a pair of washers defining a race and bearings supported within said race between the spring and the end segment of each segmented roll of the conveyor to reduce and even eliminate said drag. In addition, the thrust bearings protect the end segments from surface marking due to the springs scratching against the axial outer surfaces of the end segments. Scratching that may result in weakening said end segments is consequently reduced by the inclusion of the thrust bearings.

13 Claims, 7 Drawing Figures

APPARATUS FOR CONVEYING GLASS SHEETS

BACKGROUND OF THE INVENTION

1. Field of the Invention

This invention relates to an improvement in segmented, transversely curved rolls for conveying glass sheets and particularly those that have just been heated to a temperature sufficient for shaping and tempering. The heated glass sheets sag by gravity during their delivery through a roll forming station to a cooling area where cold tempering medium is applied toward the opposite major surfaces of said sagged glass sheets at a rate of flow and pressure sufficient to impart at least a partial temper in the sagged glass sheets. This invention also may find use in providing, in the cooling area, additional curved rolls having a transverse curvature to which the sagged glass sheets conform while conveyed thereover.

When glass sheets are conveyed on a roller hearth through a tempering apparatus that includes a heating area, a shaping area and a cooling area in end to end relation to one another, it is important that the conveying rolls of the roller hearth be of a material capable of withstanding the heat in the area in which the rolls are installed and that do not mar the engaged surfaces of the conveyed glass sheets. It is also important to minimize the relative sliding between the moving hot glass sheets and the rotating curved rolls that convey the hot glass sheets. One method the prior art used to minimize relative sliding is to drive a series of identical conveyor rolls from a common drive so that all the rolls rotate at the same rotational speed.

In the heating area, superior rolls for conveying flat glass sheets by rotation until the sheets are heated sufficiently for shaping and tempering are composed of a sintered fused silica material that is made by grinding solid fused silica into small particles and then sintering these particles to each other at a temperature below the silica fusion temperature. Such a material is readily formed into an elongated cylindrical shape required for the rolls of a roller hearth conveyor. In addition, fused silica rolls so formed have a relatively small coefficient of thermal expansion. This latter characteristic is extremely desirable due to the extreme temperature range to which the rolls of the roller hearth in the heating area of the tempering apparatus are subjected during use.

Fused silica, closely spaced, conveyor rolls of cylindrical shape are suitable for conveying flat glass sheets. Likewise, closely spaced transversely shaped rolls provide suitable support for conveying curved glass sheets. However, glass sheets transported by a conveyor of widely spaced, fused silica rolls are free to sag out of their desired transverse shapes during their conveyance between adjacent of said widely spaced rolls, particularly in the hottest portion of the roller hearth conveyor. Hence, conveyor rolls should be capable of close spacing.

Furthermore, in the cooling area beyond the heating area, fused silica rolls having such desirable properties at the elevated temperatures of the heating area are overengineered for withstanding the milder temperatures that exist downstream of the heating area. Hence, it would be practical to use rolls suitable at lower glass engaging temperatures that are less expensive than the fused silica rolls that must be used in higher temperature atmospheres.

When glass sheets are shaped in a shaping area by roll forming, as in U.S. Pat. Nos. 3,701,644 to Robert G. Frank or as in 4,139,359 to Randall S. Johnson and Terry L. Wolfe, after being delivered to a roll forming station located downstream of the heating area where the roller hearth is located, or by press bending as in U.S. Pat. No. 4,015,968 to Robert G. Revells et al., for example, or by inertia sag bending as in U.S. Pat. No. 3,476,540 to George F. Ritter et al., and the curved glass sheets are supported on a roller conveyor for passage through a cooling area, the sheets must retain their shapes during their delivery through the cooling area. Also, the conveyor should have means to prevent the forming of scuff marks on the surfaces of the curved glass sheets during the passage through the cooling area.

The glass sheet tempering art would welcome relatively inexpensive and durable rolls for conveying curved glass sheets into and through the cooling area of a glass sheet tempering apparatus. The glass sheet shaping art would welcome less expensive, curved shaping rolls than the solid ceramic rolls disclosed in the heating areas of prior art roller hearth conveyors.

In addition to maintaining the shape of the curved glass sheets and avoiding the development of scuff marks in the shaping and/or cooling area, it is also desirable to have glass sheet conveyor rolls in the cooling area that occupy a minimum possible portion of the cooling area so as to provide minimum interference with the flow of cold tempering medium toward the opposite major surfaces of the curved glass sheets to be tempered. Curved segmented rolls have been developed for use in transporting glass sheets through shaping and/or cooling stations. These rolls include short segments having interfitting elements that transmit a torque from segment to segment. A spring provided to insure positive engagement of the interfitting elements causes the end segment against which it bears to drag during a portion of each rotational cycle and also may scratch the end segment to develop wear marks on its surface facing the spring. With a single common drive rotating a plurality of segmented rolls in unison at a given average rotational velocity, the portion of each rotational cycle subject to drag and the amount of drag usually differs from roll to roll. The roll rotation must accelerate from the drag portion of the rotational cycle to equalize the average rotational speed of each roll driven from a common drive shaft. The non-uniformity of rotational speed cycles of different rolls may cause surface marks on the conveyed glass sheets. It would be beneficial to eliminate or even reduce frictional drag and surface wear of the end segment due to the biasing spring.

2. Description of Patents of Interest

U.S. Pat. No. 1,156,386 to Armstrong discloses a belt idler comprising a bracket supporting a pair of upwardly inclined spindles with an idler pulley rotatably mounted about each of the spindles. The pulleys support the upper run of a V-shaped belt, which is supported on the idler pulleys. Each idler pulley rotates independently of the other idler pulley in response to friction from the moving belt. The belt would interfere with flow of tempering medium, so that this apparatus is not suitable to convey curved glass sheets through a cooling area of glass tempering apparatus.

U.S. Pat. No. 1,516,083 to Curtis discloses a roller conveyor comprising composite rolls of concave elevation. Each composite roll comprises five axles disposed in end to end relation, a roller on each axle, a hub for each roller, four supporting brackets (one for each joint) between adjacent hubs, and means to adjust the tightness between adjacent hubs. The bracket supports intermediate the ends of the composite rolls would inhibit the free flow and escape of tempering medium, if used to convey curved glass sheets through the cooling area of glass tempering apparatus.

U.S. Pat. No. 1,927,849 to Roberts discloses a cloth expander and guide that comprises a shaft device comprising companion shafts angularly related with their inner ends pivotally connected at the center of the shaft device. Such a device would not be suitable to convey curved glass sheets through the cooling area of glass tempering apparatus.

U.S. Pat. No. 2,828,852 to Lorig discloses a roller conveyor comprising certain self-centering rolls of special construction. The special rolls are mounted on a bent shaft and comprise a pair of generally frustoconical shaped rolls or cylindrical rolls with tapered ends of smaller diameter mounted on the shaft with the small diameter ends adjacent each other. The rolls are connected to rotate at the same angular velocity. However, these rolls are not suitable for apparatus to temper curved glass sheets.

U.S. Pat. No. 2,948,384 to Pate discloses a belt conveyor comprising a plurality of rolls. Each roll includes a plurality of idler rollers mounted in spaced relation along the length of a flexible cable. The latter is stationarily fixed at its ends to a conveyor support framework. The flexible cable is tubular and provided with lubricating fittings for maintaining adequate lubrication for bearing assemblies incorporated in the idler rollers. This apparatus is not suitable for glass tempering.

U.S. Pat. No. 3,213,513 to Robertson discloses a segmented curved roll in which the ends of adjacent segments mounted on a curved shaft are stepped or rabbeted to form tightly fitting, axially overlapping joints surrounding spools. The latter are received in axially spaced end to end relation along the curved shaft with annular spacer rings separating adjacent bearing races mounted along the shaft.

U.S. Pat. No. 3,308,519 to Westgate discloses a segmented curved roll with reinforcing rings that is similar in construction to that of the Robertson patent described in the previous paragraph.

U.S. Pat. No. 3,485,618 to Ritter discloses rolls for conveying glass sheets. Each roll has a resilient spring extending between a pair of rigid stub rolls and covered by a tubular sleeve of a soft, non-abrasive, resilient material such as fiber glass cloth. The spring and stub rolls are so dimensioned that a glass sheet rests partly on the stub rolls and partly on the resilient spring when flat and, when the glass sheet is bent, it rests exclusively on the spring.

U.S. Pat. No. 3,550,758 to Stalker discloses an idler roller for conveyor belts with special lubricating structure that includes spiral grooves formed in the sidewalls of each roller to help pressurize lubricant within the grooves when the roller rotates. This apparatus is also unsuitable for glass tempering.

U.S. Pat. No. 3,763,992 to Klenk discloses a conveyor of rollers that extend obliquely of a path of movement to force sheets transported thereover toward a guide at one side thereof. The obliquely extending rollers are driven by stub shafts that extend perpendicular to the path of movement through universal joints. A belt drives the stub shafts in unison. The obliquely extending rollers are of cylindrical shape and would not be suitable for use in conveying bent glass sheets.

U.S. Pat. No. 3,799,752 to Cheron discloses rolls having straight aligned end portions interconnected by arcuate portions. The rolls pivot about their end portions between an orientation where the arcuate portions lie in a horizontal plane to support flat glass sheets and other orientations angularly disposed to the horizontal in which the arcuate portions present arcuate elevations for rotatably supporting and conveying the glass sheets.

U.S. Pat. No. 3,871,855 to Frank discloses a segmented forming roll for roll forming apparatus that is provided with snap rings that act as low friction bearings to enable adjacent segments of the forming roll to rotate independently of one another at different rotational speeds. The different rotational speeds correspond to a desired more uniform peripheral speed among the rotating segments of different diameter that cooperate to form a transverse shape corresponding to one desired for glass sheets transported thereagainst during the roll forming operation.

U.S. Pat. No. 3,918,774 to Nicholson discloses bowed rolls for use in the paper or textile industries. The rolls comprise an elongated shaft, a series of spools disposed about the shaft for rotation and bearings between the shaft and the spools. Longitudinally split spacers separate adjacent bearings. Each spacer has its opposite ends tapered to abut against surfaces of the side walls of the inner races of said adjacent bearings that are complementarily tapered. There is no teaching of how this apparatus would be suitable to temper glass.

U.S. Pat. No. 3,961,737 to Fatula discloses a self-centering roll having two tubular end rim portions mounted on a straight shaft in spaced relation to one another. Means including a deflectable end web and an inner web including an eccentric hub, bearings mounted on the eccentric hub and a member eccentric with respect to the shaft axis mounted on the outside of the bearing concentric with the bearing axis cause the end rim portions to rotate on axes that intersect at a point intermediate the inner webs and are arranged at the same angle to the shaft axis. The roll of this patent is not curved to conform to the transverse shape of conveyed glass sheets.

U.S. Pat. No. 4,033,497 to Przygocki discloses a segmented billet roll provided with removable and axially adjustable segments having tongue and groove connections that interfit with one another and may be adjusted along the length of a central shaft to lengthen or shorten the length of the billet roll to accommodate for sheets of different widths. Set screws are provided to lock the position of each segment along the length of the central shaft. The billet roll is of cylindrical shape in cross-section for use in handling flat sheets. The tongues and grooves of adjacent segments interfit closely and make parallel sliding contact over the length of the billet roll. The tight, sliding fit limits the use of the interfitting segments to cylindrical rolls.

U.S. Pat. No. 4,203,754 to Potier discloses a curved roll for conveying and shaping heat softened glass sheets that comprises a shaft having a curved portion, a rotary, flexible internally threaded tubular member slidably disposed about at least the curved portion of the shaft, a plurality of annular support means having external threading mating with the internal threading of the tubular member and sliding rings of graphite interposed between the curved portion of the shaft and the annular support means.

U.S. Pat. No. 4,226,608 to McKelvey discloses glass conveying and shaping apparatus comprising a series of horizontally spaced, flexible, conveying and shaping rolls that form a concave bed to receive softened glass sheets conveyed thereover. The opposite ends of the rolls are supported on end members whose positions are adjusted inwardly and angularly downward toward one another to apply end pressure to the opposite ends of the rolls to cause the rolls to assume predetermined concave elevational curvatures.

U.S. Pat. No. 4,311,509 to William D. Reader and Terry L. Wolfe, for APPARATUS FOR CONVEYING GLASS SHEETS, relates to curved conveyor rolls for conveying hot, flat glass sheets through a roll forming station and/or curved glass sheets into and through the cooling area of a glass sheet tempering apparatus. A conveyor comprising a plurality of said curved conveyor rolls defines a path of movement for the curved glass sheets through at least a portion of the roll forming station and/or the cooling area. The rolls extend transversely of said path and are spaced longitudinally along said path.

Each roll comprises a curved shaft having at least a portion thereof provided with an elevational shape conforming to the transverse shape of glass sheets transported thereover if located in the cooling area or the transverse shape to sag the hot glass sheets, if located in the roll forming station. A plurality of segments of essentially cylindrical configuration is mounted around said curved shaft in end to end relation with one another from one end segment at one end of said roll to another end segment at the other end of said roll. The segments intermediate the end segments have tongues extending from one axial side wall and grooves recessed within the opposite axial side wall. Tongues and grooves of adjacent segments form loose tongue in groove couplings. One of the end segments has tongues that extend to interfit loosely with grooves of its adjacent segment. The other end segment is recessed with grooves that loosely receive tongues extending from its adjacent segment. A spring mounted around the shaft insures positive interfitting between the tongues and grooves.

Means is provided to apply a torque to one of the end segments for transmission through said loose tongue and groove couplings to rotate said segments at equal rotational speeds so as to avoid scuffing the glass sheets transported thereover in the roll forming station of glass sheet shaping apparatus or the cooling area of glass sheet tempering apparatus. In addition, the loose tongue and groove couplings between adjacent segments permits a limited freedom of radial movement between said adjacent segments, whereby the segments, each comprising a hub surrounded by a collar, form essentially cylindrically-shaped segments of a segmented roll whose outer surface conforms to the shape of the curved shaft.

The segments are usable with shafts of different curvatures that are needed to produce different shapes. Only one set of segments is needed for many different production patterns.

Conveyor rolls of the Reader and Wolfe invention may be very closely spaced, if located in a roll forming station. Close roll spacing minimizes distortion of the hot glass due to sagging between adjacent rolls.

While the Reader and Wolfe rolls provide definite benefits in the handling of glass sheets during their transport over a wide temperature range, there are certain problems that require further improvements in the roll construction to overcome. These include the tendency of the springs that apply axial pressures against the end segments to weaken said end segments by marring their axial end surfaces that face the spring and to cause the rolls to drag at uncontrolled rates from roll to roll.

SUMMARY OF THE INVENTION

The present invention relates to an improvement in the curved conveyor rolls of the invention of William D. Reader and Terry L. Wolfe described and claimed in the aforementioned U.S. Pat. No. 4,311,509. In particular, the present invention reduces the wear on the surfaces of the end segments that face the springs and also reduces the lack of control of uniform rotational velocity of different rolls of the type characteristic of the Reader and Wolfe invention. The present invention interposes a thrust bearing between each spring and the end segment adjacent to the spring. The inclusion of a thrust bearing in this manner in each of the curved, segmented rolls of a conveyor section reduces and tends to equalize the drag on rotation from roll to roll and also virtually eliminates surface marking of the end segment which results in weakening said end segment. Since the segmented, shaped conveyor rolls are driven from a common drive, any device that reduces or tends to equalize the drag that the springs cause on roll rotation also reduces surface mars on the conveyed glass sheets due to relative sliding of the sheets relative to conveying rolls rotating identical average rotational velocities comprising different cycles of rotational velocity due to differences in drag among the conveyor rolls. The incorporation of a thrust bearing between the end segment and the spring provides the results desired for such a device.

These and other benefits of this invention will become obvious in the light of a description of a preferred embodiment thereof that follows.

BRIEF DESCRIPTION OF THE DRAWINGS

In the drawings that form part of a description of a preferred embodiment.

DESCRIPTION OF THE PREFERRED EMBODIMENT

The present invention relates to the novel construction of curved conveyor rolls 10 and conveyors comprising a plurality of such conveyor rolls that are especially useful when disposed along a conveyor that extends through a cooling area of apparatus for tempering curved glass sheets. It is understood, however, that the curved conveyor rolls 10 of the present invention may be employed elsewhere in glass sheet tempering apparatus or other glass sheet treatment or conveyor apparatus where it is desirable to convey shaped glass sheets on conveyor rolls having uniform rotational speeds along their entire axial lengths that engage the transverse dimension of the conveyed glass sheets transverse to the path of movement through the apparatus that treats the conveyed glass sheets. The specific embodiment of the present invention will be recited in an environment containing a cooling area of curved glass sheet tempering apparatus because the present invention is most suitable in such an environment.

Figure 1:
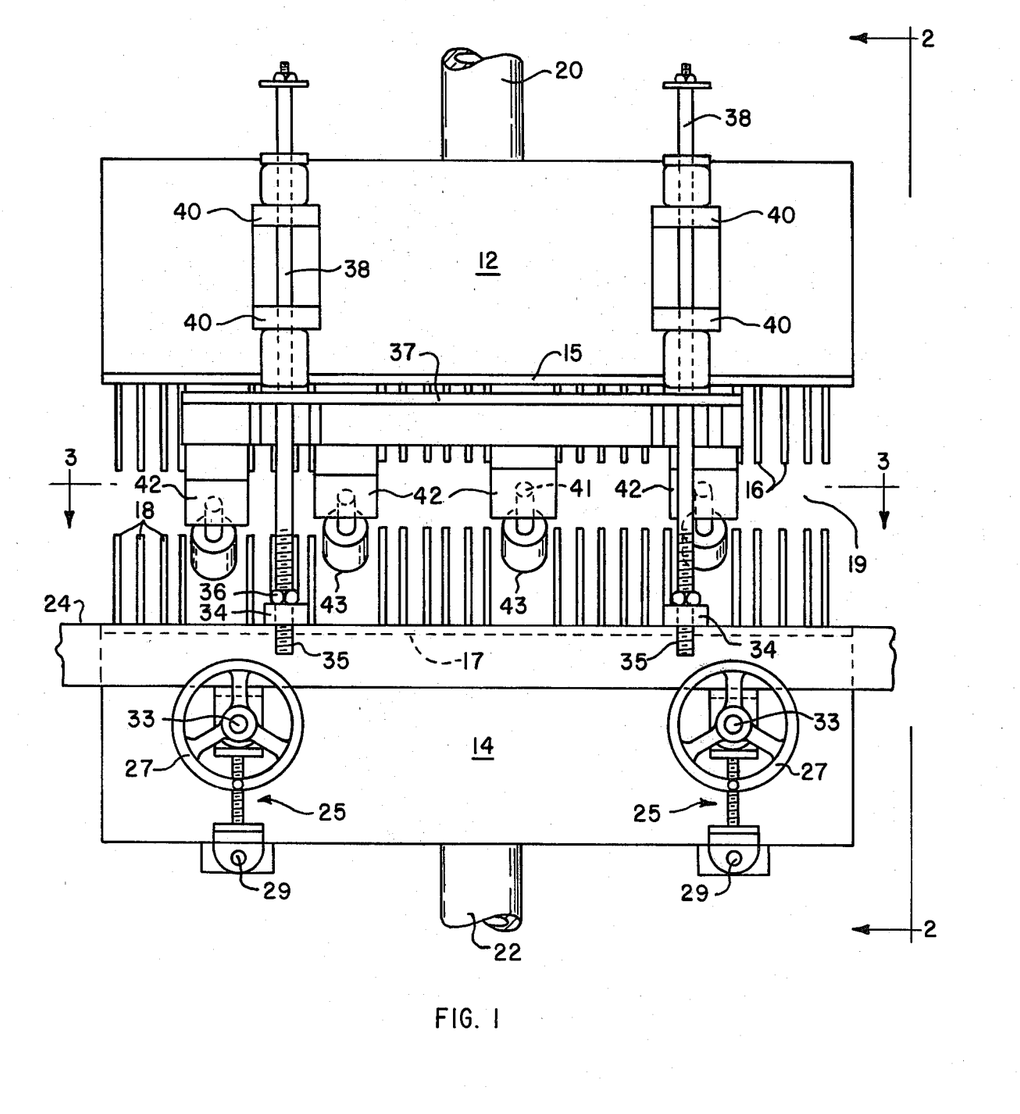
FIG. 1 is a longitudinal side view of a portion of a conveyor containing conveyor rolls modified according to the present invention.
Figure 2:
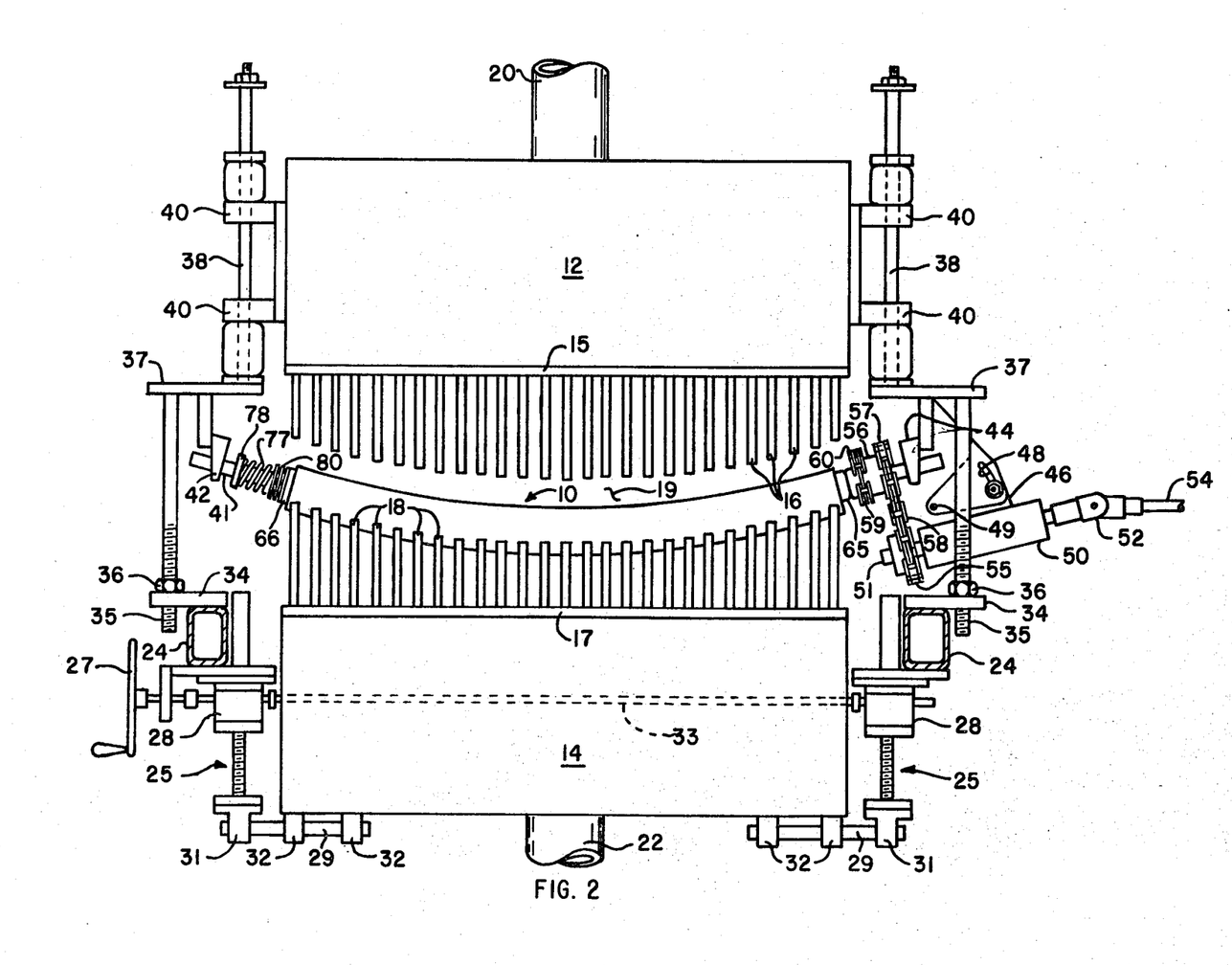
FIG. 2 is a cross-sectional view taken along the lines 2—2 at the entrance to a cooling area forming part of glass sheet tempering apparatus in which the conveyor of FIG. 1 is located.

With reference to FIGS. 1 and 2 of the drawings, the cooling area containing a plurality of longitudinally spaced transversely extending conveyor rolls 10 comprises an upper plenum 12 and a lower plenum 14. The upper plenum 12 has a lower apertured wall 15 provided with openings through which a plurality of upper nozzles 16 extend downwardly. Similarly, the lower plenum 14 has an upper apertured wall 17 through which a plurality of lower nozzles 18 extend upwardly.

A transversely curved space 19 is provided between the lower ends of the upper nozzles 16 and the upper ends of the lower nozzles 18 by extending each individual nozzle from its associated apertured plate a distance such that its end is located in an upper or lower curved surface that defines the transversely curved space. A succession of glass sheets shaped to conform to the transverse curvature of the curved rolls 10 as depicted in FIG. 2 is transported between the upper nozzles 16 and the lower nozzles 18.

The upper plenum 12 is fed from an upper fluid supply conduit 20 and the lower plenum 14 receives tempering medium under pressure through a lower fluid supply conduit 22. The conduits communicate with a pump, fan or condensor (not shown) that supplies tempering medium under pressure. The fluid under pressure is imparted through the upper nozzles 16 and the lower nozzles 18 against the opposite surfaces of the curved glass sheets that are conveyed through the transversely curved space 19 between the ends of the nozzles as the shaped glass sheets are transported through the cooling area as part of a tempering or heat-strengthening operation.

A pair of hollow horizontal beams 24 extend longitudinally on either side of the length of the cooling area. The vertical position of the horizontal beams 24 is controlled by longitudinally spaced elevator jacks 25 or other suitable support and adjustment mechanism. A plurality of cranks 27 is provided for adjusting each jack 25. A cross bar 29 extends through a sleeve 31 fixed to the bottom of each jack and through aligned sleeves 32 attached to the bottom of the lower planum 14. The vertical position of the lower plenum 14 is adjusted by adjusting the jacks 25.

In order to avoid tilting the lower plenum 14, the crank 27 is connected to a horizontal crank shaft 33 that extends through the lower plenum 14 and is connected with a corresponding jack 25 through a pair of gear boxes 28 on either side of the lower plenum 14. Thus, rotating crank 27 moves both jacks 25 equal distances.

Apertured support plates 34 are supported on the horizontal support beams 24. Threaded shafts 35 are locked in adjustable position relative to the apertured support plates 34 by lock nuts 36. The upper ends of shafts 35 engage a pair of upper plenum support brackets 37. Each of the support brackets 37 supports a vertical guide rod 38, which is guided through sleeves 40 attached to the outer side walls of the upper plenum 12 to guide the vertical movement of the upper plenum relative to the position of the apertured support plates 34, which have a fixed vertical position relative to the vertical position of the lower plenum 14. The upper plenum's position relative to the lower plenum 14 may be changed by adjusting the threaded shafts 35 and locking the vertical position thereof through suitable adjustment of the lock nuts 36.

The curved conveyor roll 10 comprises a curved shaft 41 received in a bracket support 42 at a first end portion 43 (FIG. 4) of the curved shaft 41. The latter may be either a solid rod or of tubular construction. Another bracket support 44 receives the other end portion 45 of the curved shaft 41. An adjustment bracket 46 containing walls, each having an arcuate groove 48, is connected to the bracket support 44 that receives the end portion 45 of the shaft 41. The adjustment bracket 46 is mounted on a pivot pin 49 (see FIG. 2).

The apparatus contains a drive shaft housing 50 for a drive shaft 51. The latter is connected through a flexible coupling 52 to a main drive shaft 54 connected to a motor (not shown). A sprocket 55 is mounted for rotation with the drive shaft 51. A double sprocket housing 56 is mounted around the end of the curved shaft 41 and has an outer sprocket 57 driven by a main chain drive 58.

The double sprocket housing 56 also contains an inner sprocket 59 which is connected by a chain drive 60 to the inner sprocket 59 of a double sprocket housing 61 mounted on the second curved conveyor roll 10 in a similar manner for driving its inner sprocket. Similarly, the outer sprocket 57 of double sprocket housing 61 of the second curved conveyor roll is connected through its outer sprocket 57 and an interconnecting chain drive 62 to the outer sprocket 57 of a double sprocket housing 63 of the third conveyor roll. An additional interconnecting chain drive interconnects the inner sprocket 59 of the third curved conveyor roll with corresponding inner sprocket 59 of the fourth curved conveyor roll 10, as is evident from a study of FIG. 3. This chain drive-double sprocket interconnection may be extended as far as is needed, depending on the number of special conveyor rolls in the system, and provides means to apply a torque to an end segment of each of a plurality of rolls in unison, as will be explained later.

Figures 3, 4, 5:
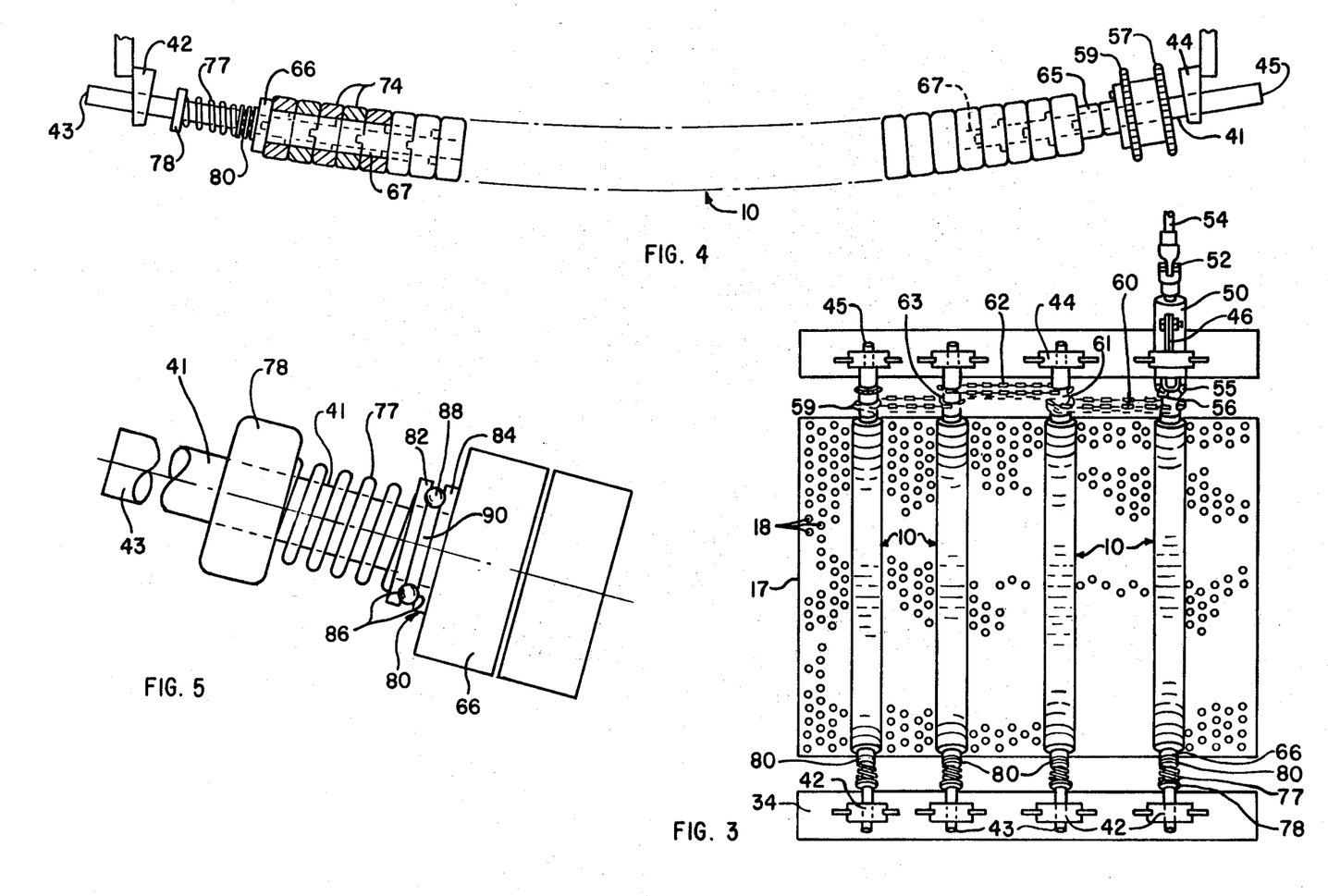
FIG. 3 is a plan view taken generally along the lines 3—3 of FIG. 1 of the portion of the cooling area containing a lower set of tempering nozzles and a plurality of conveyor rolls modified according to the present invention.
FIG. 4 is a longitudinal elevational view partly in section showing the details of the construction of a conveyor roll constructed according to the present invention.
FIG. 5 is an enlarged view of a small end portion of one of said rolls, showing how the roll supports a special bearing.

An end male hub 65, having a smooth outer wall, is mounted around the right end of the curved shaft 41, as seen in FIG. 4. At the other end of the shaft, an end female hub 66 is mounted. Intermediate the end male hub 65 and the end female hub 66 is a plurality of intermediate hubs 67. Each of the hubs 67 has a tongue 68 (FIG. 7) extending axially outward from its male wall 69 and a pair of criss-crossing grooves 70 and 71 recessed within its female wall 72. A cylindrically-shaped collar 74 is press-fit to surround each of the intermediate hubs 67 to form a segment for the segmented roll 10.

Collars 74 may be applied to end hubs 65 and 66, if desired.

Figure 7:
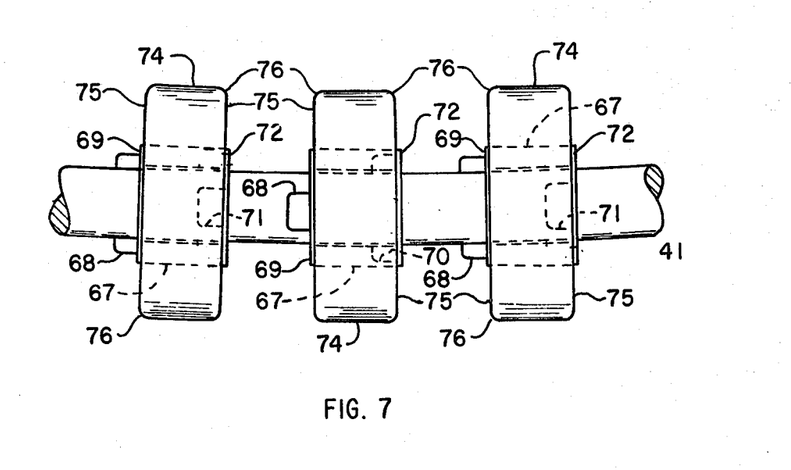
FIG. 7 is an enlarged view of a small portion of one of said rolls with properly oriented segments separated axially to show how adjacent roll segments are oriented relative to one another in a preferred embodiment of this invention.

Each cylindrically-shaped collar 74 has a pair of parallel walls 75 that are recessed axially inward approximately 1 mil (0.025 millimeter) from the adjacent male wall 69 or female wall 72 of the intermediate hub 67 over which it is fitted. Furthermore, the radially outer ends of the parallel walls 75 are rounded at radially outer corners 76 to provide clearance between adjacent cylindrically shaped collars. In addition, the tongues 68 have axial lengths approximately 60 mils (1.6 millimeters) longer and dimensions transverse to the axis of the shaft approximately 10 mils (0.25 millimeter) shorter than the corresponding dimensions of the criss-crossing grooves 70 and 71. These dimensional differences permit adjacent segments comprising the intermediate hubs 67 and the surrounding collars 74 to have loose tongue in groove connections when mounted along the length of the curved shaft 41.

The loose tongue in groove connections and the axial shortness of the segments enable the segments to be fit around curved shafts of considerably different shapes and still provide driving connections between adjacent segments with equal peripheral speeds for the segments. This feature minimizes relative sliding between conveyed glass sheets and the collars surrounding the hubs of the segments that are rotatably mounted around the curved shafts.

In assembling a roll 10, an end segment comprising an end male hub 65 or an end female hub 66 is mounted on one end of the curved shaft 41 and then segments comprising intermediate hubs 67 are mounted in end to end relation along the length of the curved shaft 41. Intermediate hubs 67 are mounted on the curved shaft 41 in alternate orientations so that the tongues 68 extending from one male wall 69 are oriented at angular relation to the tongues 68 extending from adjacent male walls 69. In other words, tongue 68 fits into the groove 70 of one intermediate hub 67 to provide a loose tongue in groove coupling between adjacent intermediate hubs, and its tongue fits loosely within the groove 71 of the next adjacent hub to provide the next loose tongue in groove coupling. Preferably, this alternating orientation extends along the length of the curved shaft 41. The other end segment contains an end female hub 66 if the first segment assembled onto the curved shaft 41 has an end male hub 65, and vice versa.

The loose fittings between the tongues and the grooves of adjacent hubs permits the segments comprising the hubs and the collars to adjust to the curved shape of the curved shaft 41 around which they are mounted, even if the shaft curvature differs along the length of the shaft or if the segments are mounted on shafts of different curvatures.

While not absolutely necessary, alternating the orientations of the tongues of adjacent intermediate hubs relative to the next adjacent hub provides a more positive rotational force when the end hub that is attached to the double sprocket housing 56 at one end of the curved conveyor roll 10 is rotated to transmit a torque through the segments along the entire length of the curved conveyor roll 10. Thus, the outer periphery of the segments defined by the outer periphery of the cylindrically-shaped collars 74 provides a uniform rotational speed throughout the length of the curved conveyor roll 10.

In order to have the segments in interfitting relation with one another along their axial lengths, a spring 77 is mounted around the curved shaft 41 between the end portion 43 and its adjacent end hub 66. The spring compresses the spaces between adjacent segments axially of the curved shaft 41 to help transmit the torque between adjacent segments along the length of the conveyor roll 10.

When a torque is applied to the segmented roll 10 with the spring 77 engaging the axially outer wall 69 of end hub 66 or its end segment, the spring scratches the wall and also causes a drag on the rotation transmitted from the driving end of the roll 10 through the loose tongue and groove connections. The scratches cause the end segments to weaken and eventually to spall, thus requiring replacement. The drag on the rotational speed is not necessarily constant and is not necessarily applied at the same portion of the rotational cycle from roll to roll. Therefore, there may be some relative slippage between one or more of the rolls and the transported glass sheets, which causes defects on the glass surface known as roll marking.

Figure 6:
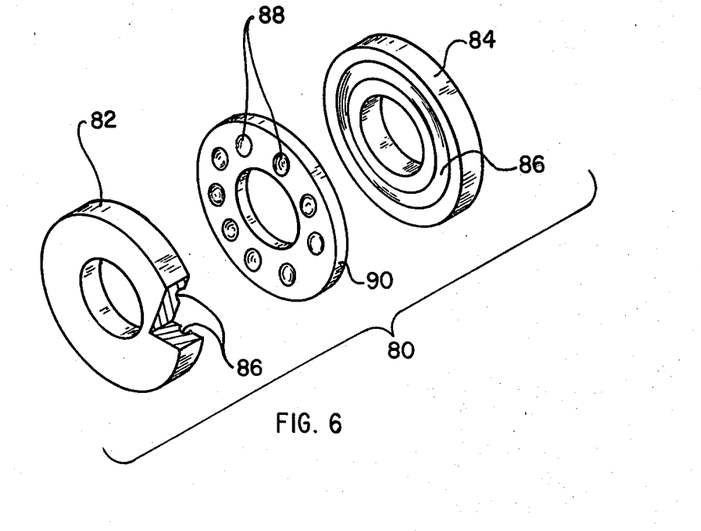
FIG. 6 is an exploded view of the elements of the bearing of FIG. 5.

The present invention interposes a thrust bearing 80 around the curved shaft 41 between the end hub 66 (or an end segment if a collar 74 is mounted around the end hub) and the spring 77. The thrust bearing 80 comprises a pair of washers 82 and 84. Each washer has a circumferential groove 86 in the surface facing the other washer. The grooves 86 are aligned with one another to receive a series of bearings 88 carried by a flat bearing support ring 90. The grooves 86 cooperate to form a circumferential race for the bearings 88. The ring 90 is sandwiched between washers 82 and 84. Because of this structure, the bearing transmits an axial thrust between the spring 77 and the end hub 66. At the same time, it also allows the end hub 66 to rotate relative to the spring 77 without allowing the spring 77 to scratch the end wall 69 that faces the spring. In addition, the thrust bearing 80 is free to slide axially along the curved shaft 42 and reduces the uncontrolled drag and surface damage that sometimes results from having the spring in direct contact with an axially outer surface of a wall of a hub or of a segment.

In a typical embodiment of this invention to produce glass sheets having a 76 inch (193 centimeter) radius of curvature, curved conveyor rolls 10 are mounted on curved steel shafts 41 having a diameter of ½ inch (1.27 centimeters) and a transverse central portion curved to a radius of 76 inches (193 centimeters) along a curved length of 24 inches (61 centimeters) and straight ends for mounting within shaft supporting brackets 42 and 44. Each of the hubs was formed of bronze and had an axial length of ¾ inch (1.9 centimeters) with circumferential walls ¼ inch (6.35 millimeters) in radial thickness. Tongues ¼ inch (6.35 millimeters) long and ¼ inch (6.35 millimeters) wide fit in the axial direction into recesses 1.32 inch (0.8 millimeter) shorter than the tongues and having circumferentially extending, diametrically opposed grooves wider than the tongues to provide 1/32 inch (0.8 millimeter) clearance therebetween. The collars 74 surrounding the hubs 65, 66 and 67 were composed of a fiber glass reinforced epoxy resin believed to be a highly cured methyl phenyl silicone sold as Synthane G-7 electric board by the Synthane Taylor Company of Valley Forge, Pa. and had an inner diameter of 1 inch (2.54 centimeters) to fit snugly around the hubs and an outer diameter of 2 inches (5.08 centimeters). The rounding at the corners 76 of the collars 74 was infinitesimal, merely sufficient to avoid having the segments catch the glass edge and cause the glass to skew due to the rotation at the corners of the collars of the segments forcing the glass sheets to skew. Some of the adjacent rolls 10 were spaced on 6 inch (15.24 centimeter) centers and other adjacent rolls were spaced on 8 inch (20.32 centimeter) centers. Thus, the curved conveyor rolls were spaced longitudinally of each other a distance several times greater than the diameter of said curved conveyor rolls 10.

While the rolls just described are especially suitable for use in a cooling area of apparatus for tempering curved glass sheets, they are also suitable for use in higher temperature environments. Under such circumstances, the curved shafts 41 are preferably tubular rather than solid rod construction to permit the application of cooling fluid through the length of the shaft. The collars may be composed of quartz or other higher temperature resistant material. In addition, it may be desirable to enclose the rolls in sleeves of heat-insulating material, such as fiber glass and the like, to insulate the segments from direct contact with hot, moving glass sheets and to insulate the segments from direct exposure to the elevated temperature of the environment, in case the rolls are located in hotter portions of thermal treatment apparatus than the cooling area of glass sheet tempering apparatus.

When the apparatus is used to process glass sheets having a significantly different curvature from those previously produced, it is not necessary to replace the entire roll structure. The segments can be used with a different set of curved shafts conforming to the different shape desired for the new production items, so no large inventory of segments is needed for replacement rolls. Sets of curved shafts for different shapes require much less storage space than complete sets of conveyor rolls.

The form of the invention shown and described in this specification represents an illustrative preferred embodiment thereof. It is understood that various changes may be made, such as varying the number, size, thickness and construction of the thrust bearing elements. For example, the bearings may be composed of nylon or TEFLON washers sandwiched between a pair of steel washers. These changes may be made without departing from the gist of the invention as defined in the claimed subject matter which follows.

We claim:

1. In a conveyor roll for conveying glass sheets comprising:
   (a) a curved rigid shaft having at least a portion thereof provided with an elevational shape conforming to the transverse shape of the glass;
   (b) means for supporting said curved shaft at its ends so that said curved portion extends transversely of a path of movement for said glass sheets;
   (c) a plurality of segments of essentially cylindrical configuration mounted around said curved shaft in end to end relation with one another from one end segment at one end of said plurality of segments to another end segment at the other end of said plurality of segments, said segments having loosely interfitting tongues and grooves at the axial ends of adjacent of said segments that form loose interfitting tongue and groove couplings capable of transmitting a torque between adjacent of said segments while permitting a limited freedom of axial movement between said adjacent segments;
   (d) means for applying a torque to one of said end segments; and
   (e) means mounted around said shaft in position to apply a biasing pressure against the other of said end segments to bias said segments in an axial direction sufficiently to retain a loosely fitting relation between said tongues and grooves and to enable said segments to transmit a torque applied to said one end segment through said segments to said other end segment, whereby when said segments rotate, said biasing means tends to mar the outer axial surface of said end segment and to cause a drag on the rotation of said roll,
   the improvement comprising a thrust bearing mounted around said shaft and interposed between the outer axial surface of said end segment and said biasing means to protect said outer axial surface from said marring and to permit the application of said biasing pressure on said end segment while minimizing said drag.

2. A conveyor roll as in claim 1, wherein said segments comprise a pair of end segments consisting essentially of an end hub mounted around said curved shaft and said segments intermediate said end segments each comprise a hub mounted around said curved shaft in end to end relation with the hubs of segments adjacent thereto and a cylindrically shaped collar of a material that does not mar glass in tightly fitting relation around each of said hubs of said intermediate segments.

3. A conveyor roll as in claim 2, wherein each of said hubs intermediate said end segments is provided with a male wall having a pair of diametrically opposed tongues extending axially outward of said hub and a female wall having two pairs of diametrically opposed grooves extending axially inward of said hub, said tongues having given axial and transverse dimensions, said grooves having transverse dimensions slightly longer than said tongues and axial dimensions shorter than said tongues, whereby said tongues of each said hub fit loosely within corresponding grooves of said adjacent hub to enable said plurality of hubs to follow the curvature of said curved shaft when they are mounted with said tongues loosely interfitting with said grooves.

4. A conveyor roll as in claim 3, wherein the pair of tongues extending axially outward from said one of said hubs is received in said pair of said grooves extending axially inward from said adjacent hub at one orientation and said pair of tongues of said adjacent hub is received in said pair of said grooves of said next hub adjacent to said adjacent hub at a different orientation from said one orientation.

5. A conveyor roll as in claim 1 or claim 2 or claim 3 or claim 4, wherein said collars have slightly shorter axial lengths than their associated hubs.

6. A conveyor roll as in claim 5, wherein said collars have smooth circumferential surfaces with rounded axial end portions.

7. A conveyor roll as in claim 1, wherein said curved rigid shaft is a solid rod.

8. A conveyor roll as in claim 1, wherein said curved rigid shaft is of tubular construction.

9. A conveyor roll as in claim 1, further including a sleeve of heat-insulating material of fiber glass or the like surrounding said conveyor roll.

10. A conveyor roll as in claim 1, wherein said thrust bearing comprises a pair of thrust washers, each having a circumferential groove facing a circumferential groove on an inner surface thereof to form a bearing support race, a bearing support ring sandwiched between said washers, and a plurality of bearings carried by said bearing support ring in position to rotate freely within said race.

11. A conveyor for conveying glass sheets comprising a plurality of conveyor rolls as in claim 1 or claim 10 extending transversely of said path of movement for said glass sheets and longitudinally spaced from one another along said path, further including means to apply a torque to one of said end segments of each of said plurality of said rolls to rotate said rolls in unison, the presence of said thrust bearings intermediate said spring and said adjacent end segment of each of said segmented rolls reducing the drag on the rotation of said rolls to such an extent that said rolls rotate in unison with essentially a minimum of drag that is approximately uniform from roll to roll.

12. A conveyor as in claim 11, wherein said path of movement extends through a cooling area included in glass sheet tempering apparatus, further comprising nozzles on each side of said path intermediate the positions occupied by said conveyor rolls and means to supply tempering medium for delivery under superatmospheric pressure through said nozzles toward the opposite surfaces of said glass sheets as the latter are conveyed through said cooling area.

13. A conveyor as in claim 12, wherein said conveyor rolls in said cooling area are spaced longitudinally of each other a distance greater than the diameter of said conveyor rolls.

* * * * *